March 6, 1951  J. D. E. VENNING  2,544,476
AIR OR GAS RELIEF VALVE
Filed Feb. 7, 1945
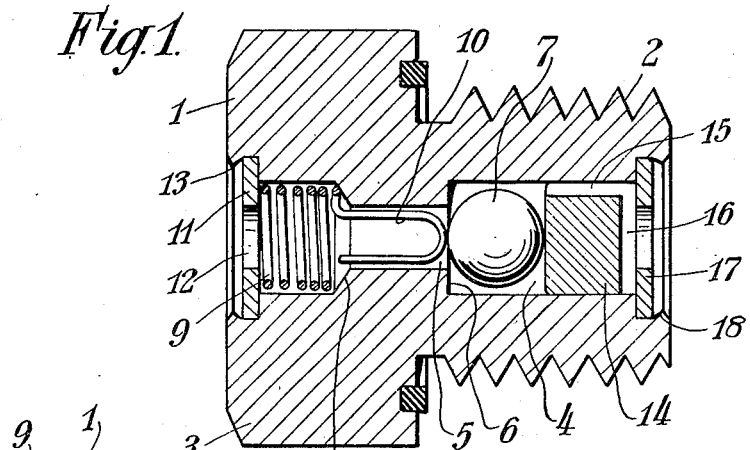
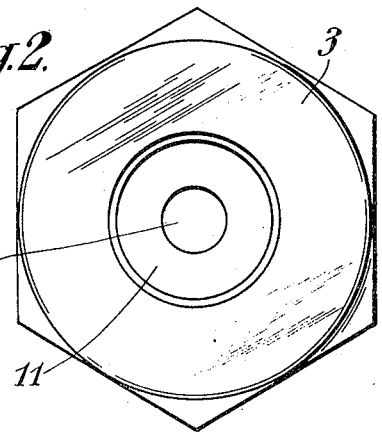
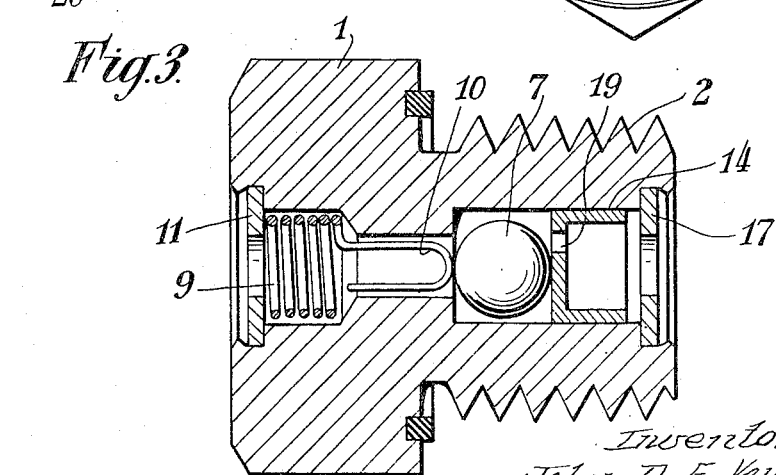
Inventor
John D. E. Venning Patented Mar. 6, 1951

2,544,476

UNITED STATES PATENT OFFICE 2,544,476

AIR OR GAS RELIEF VALVE

John Daniel Eldret Venning, Alton, England, assignor to John Venning & Company Limited, Alton, England, a British company Application February 7, 1945, Serial No. 576,521
In Great Britain August 10, 1944

7 Claims. (Cl. 277—45)

This invention relates to air or gas relief valves.

One object of the invention is to provide a valve which is capable of being applied readily in any suitable position in a pipe line or apparatus through which a liquid such as oil or water is to pass, or in which it is to be contained, at atmospheric or higher pressure, the valve allowing any air or gas which may collect in the vicinity thereof and be liable to cause a disturbance in the flow of liquid, to escape automatically from the pipe line or apparatus.

Another object of the invention is to provide a relief valve in which air or other gas can be removed from a pipe line or other apparatus without losing or otherwise wasting liquid.

A further object of the invention is to provide a relief valve which can be arranged to allow unwanted mixtures of both gases and liquids to be expelled without loss of true liquid.

A further object of the invention is to provide a relief valve which is sensitive in operation thus contributing to an efficient arrangement.

A further object of the invention is to provide a non-return relief valve in which air or gas cannot return to the pipe line or apparatus in which the valve is fitted.

Yet a further object of the invention is to provide a simple valve construction of small size in comparison with valves at present in use.

These and other objects of the invention will be better understood after reading the following description of the accompanying drawings, in which the invention is illustrated, and wherein—

Figure 1 is a section through one form of valve made according to the invention;

Figure 2 is an end view of Figure 1;

Figure 3 is a section similar to Figure 1 of a modification;

Figure 4 is a section also similar to Figure 1, of a further modification.

Referring to Figs. 1 and 2, the valve body 1 is provided at one end with an externally threaded portion 2, for engagement with a pipe or apparatus, and at its other end with a hexagonal or other suitably shaped head 3 for engagement with a spanner.

The body is provided with an axial, preferably circular, bore 4, of which a portion 5, at about the middle of its length is of reduced diameter.

Towards the screw threaded end the large and small portions of the bore are connected by a shoulder 6 which forms a seat for a ball valve 7. The valve seat may, however, be of conical, concave or convex shape.

The connection of the reduced portion 3 of the bore with the enlarged portion of the bore 4 at the other end of the body may be effected by a conical, concave or convex shoulder portion 8.

In the enlarged bore portion of the body at the head end is located a light helical spring 9 which is provided with a stem 10 extending through the reduced portion 5 of the bore so as to bear against the valve 7, in order to hold it normally away from its seat.

The stem 10 is preferably formed integral with the spring 9 and is formed in the example illustrated, by compressing one of the coils of the spring into the shape of a hairpin and bending it axially away from the spring.

The spring is held in the bore by a washer 11 which is suitably apertured, for example by being provided with a central opening 12. The washer 11 is fitted into a recess 13 in the headed end of the body, the washer being held in the recess by upsetting the walls of the latter inwardly. A cap may be used in place of the washer.

The ball valve 7 is fitted into the enlarged portion of the bore 4 at the threaded end 2 of the body 1 and into the other end of this enlarged bore portion is fitted, with clearance, a cylindrical piston 14 against which the valve 7 bears. The piston 14 is provided at its periphery with one or more longitudinal grooves 15, which communicate with one or more radial or diametrical grooves 16 in the face of the piston remote from the valve. The grooves 15, 16 are preferably of a cross sectional area whereby the resistance of the piston 14 to the passage of liquid can be controlled. The ratio of the diameter to the length of the piston 14 is such as to ensure that the piston slides freely within the bore 4 when subjected to the action of a liquid, without becoming wedged.

The piston 14 is retained in the bore 4 by a ring or washer 17 which engages with a recess 18 in the end of the body and is secured therein in the manner above described in connection with the washer 11.

The enlarged bore portion 4 in which the valve 7 and piston 14 are located is of such a length as to permit of a limited movement thereof in the bore.

The operation of a valve as above described is substantially as follows:

As the operation of the valve depends upon the difference of resistance to flow between air or other gases and liquids such as oil or water, and assuming that the valve is connected to a point located at a high level in a pipe or apparatus, any air or gas located in the pipe or apparatus flows through the grooves 15, 16 in the piston member 14 and then passes upwardly around the valve 7, past the valve seat, and through the narrow bore portion 5, the bore portion containing the spring 9, and the opening or openings 12 in the retaining cap or washer 11, and into the atmosphere. Whilst air or gas is flowing, the valve 7 and piston 14, due to the action of the spring 9, do not tend to move upwardly, but as soon as liquid commences to flow through the grooves 15, 16 in the piston, the greater resistance to flow thereof causes the piston 14 to rise and move the valve 7 towards and against its seat, against the action of the spring 9, thus causing the liquid to build up behind the valve 7 and to hold it firmly on its seat. As the liquid now holds the valve 7 against its seat, and there is no further flow of liquid, the piston 14 slides back to its normal position under the action of gravity, if desired with the assistance of spring action.

In the modification shown in Fig. 3, the equivalent parts are referred to by the same reference numerals. In this figure, the piston 14 is in the form of a hollow cylinder having a thin wall, closed at the end adjacent the ball valve 7, and open at the other end. The closed end of the piston is perforated to provide a port 19 of suitable dimensions to provide an air passage, this arrangement replacing the grooves 15, 16 in the solid piston 14 of Figs. 1 and 2. The port 19 is disposed eccentrically to the piston. This modified arrangement serves to lighten the valve as a whole and provides improved accessibility.

In the valve shown in Fig. 4 the arrangement is such as to prevent air or gas returning through the valve to the pipe line or apparatus in which the valve is fitted when the pressure has dropped, thus avoiding consequent waste of liquid. In this modification the axial bore 4 in the body 1 is formed with an abutment 20 forming a reduced portion 21 of the bore to receive a stem 22 of a mushroom valve 24 disposed between the spring 9 and the ball valve 7 actuated, as in Fig. 3, by a hollow piston 25. In this case the side wall of the piston is formed with a port 26 in the side wall near the closed end thereof. This port, in the arrangement shown, is in lieu of the port 19 (Fig. 3), but a port such as 19 and a groove such as groove 15 (Fig. 1) may be provided additionally, and, further, the piston may be a predetermined loose fit in the axial bore 4, to provide a definite leakage, the arrangement being such that all air or gas in the valve can escape before the incoming liquid.

In the arrangement shown in Fig. 4 opposite sides of the abutment 20 form respectively seats for the two valve members 24, 7. Under normal conditions the operation is as previously described. However, when the pressure in the pipe line or apparatus drops below atmosphere, i. e. when the pipe line or apparatus is released to waste, the spring 9 closes the valve 24 on its seat and prevents air or gas entering through the air valve, so that under these conditions the valve acts as a non-return valve to the atmosphere.

It will be evident that the stem 22 may be provided on the ball valve instead of on the mushroom valve 24, or a stem separate from both valves may be used. The stem may be of such a length that only one of the two valves is on its seat at any one time.

Amongst the advantages of the invention may be mentioned the following:

The invention makes it possible to remove air or other gases from pipe lines or other apparatus containing or about to contain liquid such as oil or water, automatically and without losing or otherwise wasting the liquid.

The spring provides means to prevent premature closing of the valve before all the gases have escaped by the action of the direct pressure energy, such as would be the case if no spring were present and the maximum pressure drop across the valve as a whole were obtained; and to insure that the valve member be returned in readiness for the commencement of another cycle. The spring also serves to provide a force by which the non-return valve may be held to its seat to prevent ingress of gas.

The fact that the piston is a separate member from the main (ball) valve will provide freedom for the valve to align itself on its seat without being influenced by any accidental mis-alignment of the piston should such occur.

After the cycle of operation is completed and the system has attained its working load, the piston being within a closed chamber has no forces acting upon it and is free to fall back or return to normal position, the ball being forced by the load to its seat and is retained in this position until the load has been reduced to a degree to allow the spring acting on the non-return valve to move the ball valve away from its seat, which action takes place with more facility and precision due to the inertia of the ball valve alone having to be overcome.

By suitable arrangement of the piston 14, valve 7 and spring 9 a sufficient delay in operation may be provided to allow unwanted mixtures of both gases and liquids to be expelled without loss of true liquid.

As the piston is used only for positioning the valve, and not for holding it against its seat, it is capable of returning to its starting position in readiness for immediate operation when required, the spring 9 acting on the valve member 7 presents little or no resistance to the piston, and when the liquid pressure within the pipe line falls the valve becomes sensitive in operation, thus contributing to the efficiency of operation and preventing loss of liquid.

The valve may be readily constructed as a non-return valve.

Owing to its simplicity in construction the valve may be made of small size in comparison with valves at present in use for similar purposes, thus enabling it to be installed in more convenient and efficient positions.

What I claim and desire to secure by Letters Patent is:

1. In a relief valve, a body having an axial bore providing an inlet and an outlet, an apertured abutment in said bore, a valve seat formed on the side of said abutment facing the inlet of said bore, a valve member adapted to engage said seat, a piston movable in said bore and engaging said valve member remote from said valve seat, said piston having means offering resistance to the flow of a gas insufficient to move said valve member to said seat but offering relatively increased resistance to the flow of a liquid to force said valve member to said seat, thus permitting passage of a gas past said valve member and seat whilst preventing the passage of liquid therethrough, a second valve seat on the opposite side of said abutment, a second valve member adapted to engage said second seat and barring return flow to the first side of said abutment, yieldable means reacting on said body and second valve member to seat said second valve member, and a distance member slidablly disposed in the aperture of said abutment, cooperating with the valve members and of such length as to hold one of said valve members from its seat while the other engages its seat under the pressure of said yieldable means.

2. In a relief valve, a body having an axial bore providing an inlet and an outlet, an apertured abutment in said bore, a valve seat formed on the side of said abutment facing the inlet of said bore, a valve member adapted to engage said seat, a piston movable in said bore and engaging said valve member remote from said valve seat, said piston having means offering resistance to the flow of a gas insufficiet to move said valve member to said seat but offering relatively increased resistance to the flow of a liquid to force said valve member to said seat, thus permitting passage of a gas past said valve member and seat while preventing the passage of liquid therethrough, a second valve seat on the opposite side of said abutment, a second valve member adapted to engage said second seat and barring return flow to the first side of said abutment, yieldable means reacting on said body and second valve member to seat said second valve member, and a distance member slidably disposed in the aperture of said abutment and formed in one piece with one of said valve members, cooperating with the valve members and of such length as to hold one of same from its seat while the other engages its seat under the pressure of said yieldable means.

3. In a relief valve, a body having an axial bore providing an inlet and an outlet, an apertured abutment in said bore, a valve seat formed on the side of said abutment facing the inlet of said bore, a valve member adapted to engage said seat, a piston movable in said bore and engaging said valve member remote from said valve seat, said piston being of hollow construction and including leakage means so that air and gas can escape but not liquids, a second valve seat on the opposite side of said abutment, a second valve member adapted to engage said second seat and barring return flow to the first side of said abutment, yieldable means reacting on said body and second valve member to seat said second valve member, and a distance member slidably disposed in the aperture of said abutment, cooperating with the valve members and of such length as to hold one of said valve members from its seat while the other engages its seat under the pressure of said yieldable means.

4. In a relief valve, a body having an axial bore providing an inlet and an outlet, a valve member in said bore, an apertured abutment in said bore and having on the side facing the inlet a valve seat for said valve member, a piston in said bore, and engaging said valve member and having means permitting leakage of air and gas but not liquid while said valve member is distant from said seat, a second seat formed on the opposite side of said abutment, a second valve member engaging said second valve seat and barring return flow to the first side of said abutment, a distance member slidably disposed in said abutment aperture cooperating with the valve members and of such length as to hold said valve members apart, and spring means acting on said first valve member through said second valve member and said distance member.

5. In a relief valve, a body having an axial bore providing an inlet and an outlet, a valve member in said bore, an apertured abutment in said bore and having on the side facing the inlet a valve seat for said valve member, a piston in said bore and engaging said valve member and having means permitting leakage of air and gas but not liquid while said valve member is distant from said seat, a second seat formed on the opposite side of said abutment, a second valve member engaging said second valve seat and barring return flow to the first side of said abutment, a distance member slidably disposed in said abutment aperture and holding said valve members apart, the length of said distance member being such that only one valve member can be pressed on its seat at any one time, and spring means acting on said first valve member through said second valve member and said distance member.

6. In a relief valve, a body having an axial bore providing an inlet and an outlet, a valve member in said bore, an apertured abutment in said bore and having on the side facing the inlet a valve seat for said valve member, a piston in said bore, engaging said valve member and being of hollow construction and provided with means permitting of leakage so that air and gas can escape but not liquid, a second seat formed on the opposite side of said abutment, a second valve member engaging said second valve seat and barring return flow to the first side of said abutment, a distance member slidably disposed in said abutment aperture cooperating with the valve members and of such length as to hold said valve members apart a greater distance than that between the seats, and spring means acting on said first valve member through said second valve member and said distance member.

7. In a relief valve, a body portion having an axial bore, providing an inlet and an outlet, an apertured abutment in the axial bore, a valve seat for a valve member formed on said abutment and facing the inlet end of said bore, a valve member cooperating with said seat, a piston disposed at the side of the valve member remote from the abutment, said piston being of hollow construction and provided with means permitting of leakage so that air and gas can escape before incoming liquid and being adapted to offer insufficient resistance to the flow of a gas to move the piston but to be responsive to the relatively increased resistance to the flow of a liquid to compel piston movement to force the valve member onto its seat, thus permitting passage of a gas through the valve member while preventing the passage of liquid therethrough, a second valve seat formed in the opposite side of the abutment, a second valve member associated with said second valve seat and adapted to operate as a non-return valve, a distance member formed in one piece with one of said valve members and slidably disposed in the aperture of said abutment and adapted to hold said valve members apart, the length of said distance member being such that only one valve member can be pressed onto its seat at any one time, and spring means acting on said first valve member through said second valve member and said distance member.

JOHN DANIEL ELDRET VENNING.

REFERENCES CITED

The following references are of record in the file of this patent:

UNITED STATES PATENTS

| Number | Name | Date |
|---|---|---|
| 725,640 | Wemmer | Apr. 14, 1903 |
| 1,494,026 | Samuelson | May 13, 1924 |
| 1,747,456 | Noble | Feb. 18, 1930 |
| 1,854,094 | Aschenbach | Apr. 12, 1932 |
| 2,046,228 | Wiedmann | June 30, 1936 |
| 2,125,662 | Work | Aug. 2, 1938 |
| 2,164,272 | Higgins | June 27, 1939 |
| 2,331,431 | Simoneau | Oct. 12, 1943 |
| 2,372,456 | Stewart | Mar. 27, 1945 |

FOREIGN PATENTS

| Number | Country | Date |
|---|---|---|
| 115,819 | Austria | Jan. 10, 1930 |
| 470,171 | Great Britain | Aug. 10, 1937 |
| 827,828 | France | Feb. 2, 1938 |